(12) United States Patent
Murray

(10) Patent No.: US 8,312,846 B1
(45) Date of Patent: Nov. 20, 2012

(54) ANIMAL LOADING/UNLOADING APPARATUS

(76) Inventor: Alan Murray, Smith River, CA (US)

( * ) Notice: Subject to any disclaimer, the term of this patent is extended or adjusted under 35 U.S.C. 154(b) by 559 days.

(21) Appl. No.: 11/702,692

(22) Filed: Feb. 6, 2007

(51) Int. Cl.
*B65G 69/28* (2006.01)

(52) U.S. Cl. ............................................. 119/847

(58) Field of Classification Search .............. 119/843, 119/847–849, 42, 45; 296/24.31; 14/69.5; B65G 11/00, 69/28, 69/30
See application file for complete search history.

(56) References Cited

U.S. PATENT DOCUMENTS

| | | | | |
|---|---|---|---|---|
| 106,887 A | * | 8/1870 | Street | 119/400 |
| 1,739,335 A | * | 12/1929 | Tangeman | 119/849 |
| 1,782,554 A | * | 11/1930 | Tool | 119/849 |
| 1,946,013 A | * | 2/1934 | Campbell | 119/406 |
| 2,129,438 A | * | 9/1938 | Nitsche | 296/10 |
| 2,228,946 A | * | 1/1941 | Carter | 414/537 |
| 2,584,396 A | * | 2/1952 | Naekel | 414/537 |
| 2,612,027 A | * | 9/1952 | McGan | 62/241 |
| 3,741,529 A | * | 6/1973 | Blagg | 256/26 |
| 4,010,974 A | * | 3/1977 | Day | 296/24.31 |
| 4,439,087 A | * | 3/1984 | Schink | 414/537 |
| 5,071,185 A | * | 12/1991 | Schiele | 296/3 |
| 5,312,149 A | | 5/1994 | Boone | |
| 5,509,709 A | * | 4/1996 | Carroll | 296/3 |
| 6,119,634 A | | 9/2000 | Myrick | |
| 6,264,416 B1 | | 7/2001 | Eaton, Jr. | |
| 6,267,082 B1 | | 7/2001 | Naragon et al. | |
| 6,328,366 B1 | | 12/2001 | Foster et al. | |
| 6,499,783 B1 | * | 12/2002 | Husted | 296/24.31 |
| 6,725,487 B2 | | 4/2004 | Myrick et al. | |
| 7,309,202 B1 | * | 12/2007 | Anderson | 414/537 |
| 2002/0140245 A1 | * | 10/2002 | Coleman et al. | 296/26.09 |

* cited by examiner

*Primary Examiner* — Richard Price, Jr.

(74) *Attorney, Agent, or Firm* — Jerry Haynes Law

(57) ABSTRACT

An animal loading and unloading apparatus is disclosed. An illustrative embodiment of the animal loading/unloading apparatus includes a base having a ramp space, a fence carried by the base and a ramp extendable from the ramp space.

20 Claims, 5 Drawing Sheets

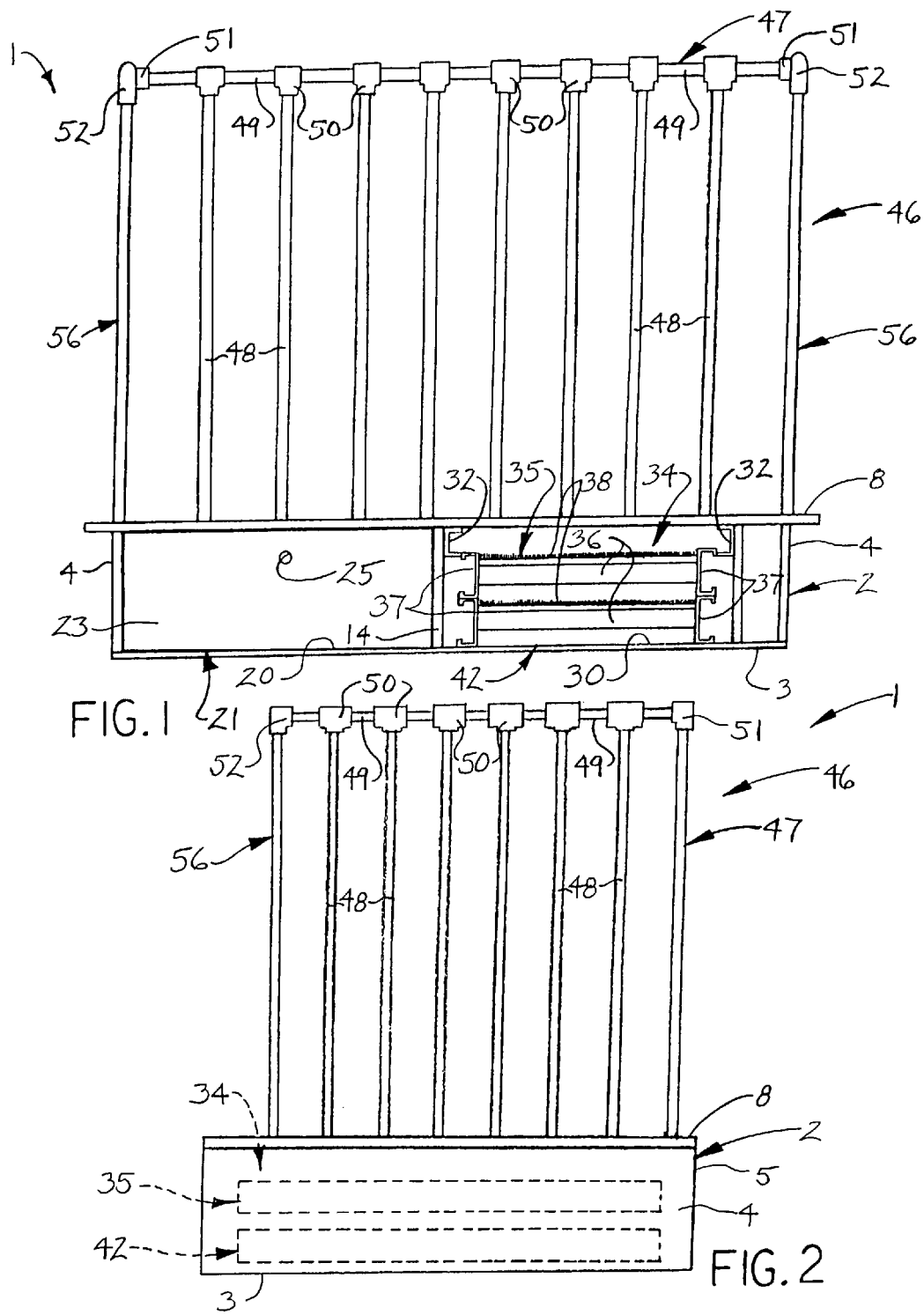

ANIMAL LOADING/UNLOADING APPARATUS

FIELD

The present invention relates to pet ramps and the like. More particularly, the present invention relates to an animal loading and unloading apparatus which is suitable for loading animals in and removing animals from a vehicle.

BACKGROUND

Many persons transport animals in vehicles. Placement of the animals, particularly large dogs, in the vehicle requires that the animal jump or be lifted and placed in the vehicle. The seat or floor of the vehicle may be two to three feet above the ground. While such a height is not difficult for young, vigorous animals to mount, jumping to such a height is more difficult or impossible for older animals.

SUMMARY

The present invention is generally directed to an animal loading and unloading apparatus. An illustrative embodiment of the animal loading/unloading apparatus includes a base having a ramp space, a fence carried by the base and a ramp extendable from the ramp space.

BRIEF DESCRIPTION OF THE DRAWINGS

The invention will now be described, by way of example, with reference to the accompanying drawings, in which:

FIG. 1 is a front view of an illustrative embodiment of the animal loading/unloading apparatus;

FIG. 2 is a side view of an illustrative embodiment of the animal loading/unloading apparatus;

DETAILED DESCRIPTION

Figure 3:
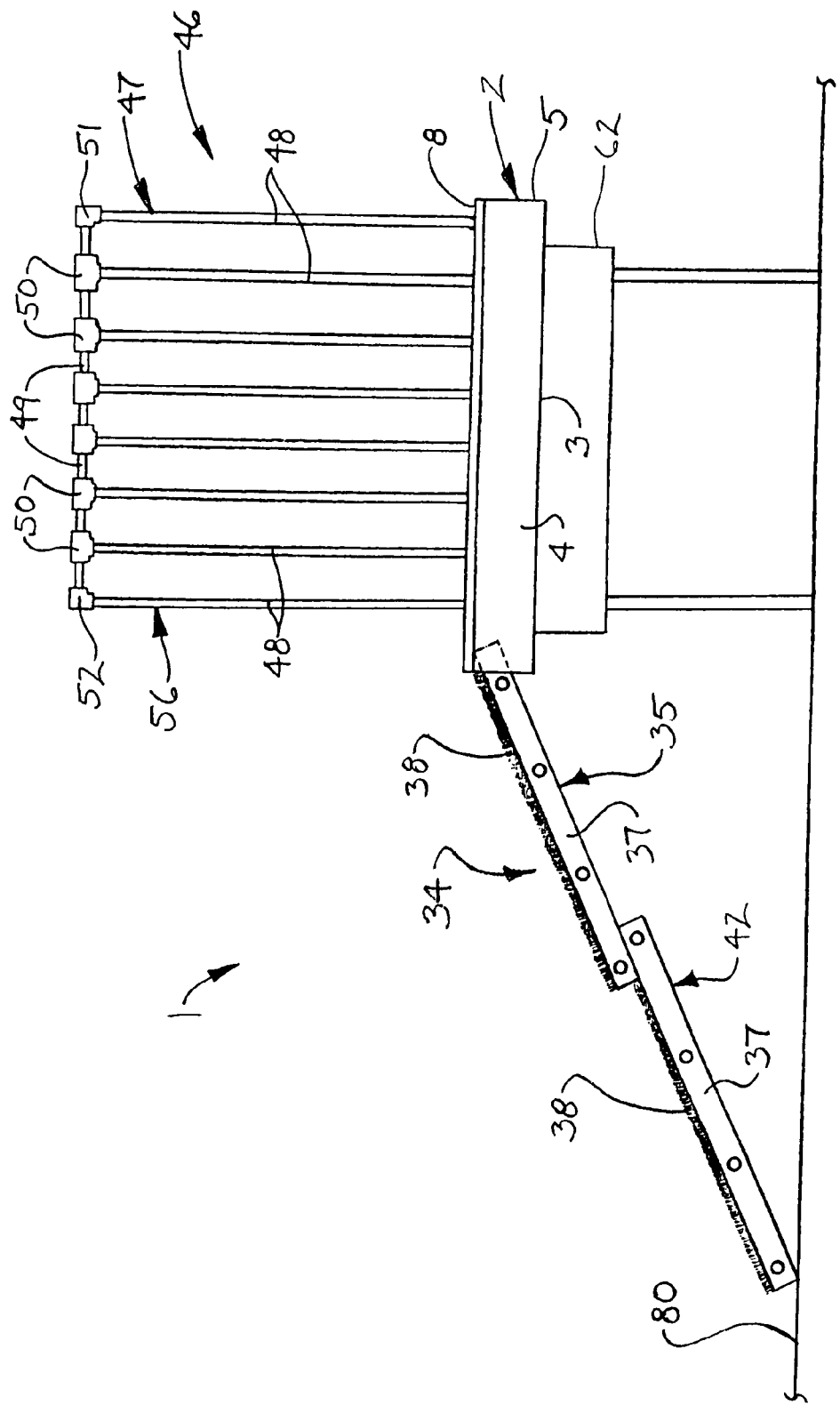
FIG. 3 is a side view of an illustrative embodiment of the animal loading/unloading apparatus, supported on a table and with a ramp element of the apparatus deployed in an extended, functional configuration.

Referring to the drawings, an illustrative embodiment of the animal loading/unloading apparatus, hereinafter apparatus, is generally indicated by reference numeral 1. The apparatus 1 includes a base 2 which may have a generally elongated, rectangular shape, as shown, or any desired alternative shape. The base 2 is typically a lightweight, impact-resistant plastic or a lightweight metal such as aluminum. As shown in FIGS. 1 and 2, the base 2 typically includes a bottom base panel 3; a pair of spaced-apart side base panels 4 extending from the bottom base panel 3; and a rear base panel 5 extending from the bottom base panel 3, between the side base panels 4. A platform panel 8 is provided on the side base panels 4 and the rear base panel 5.

Figure 4:
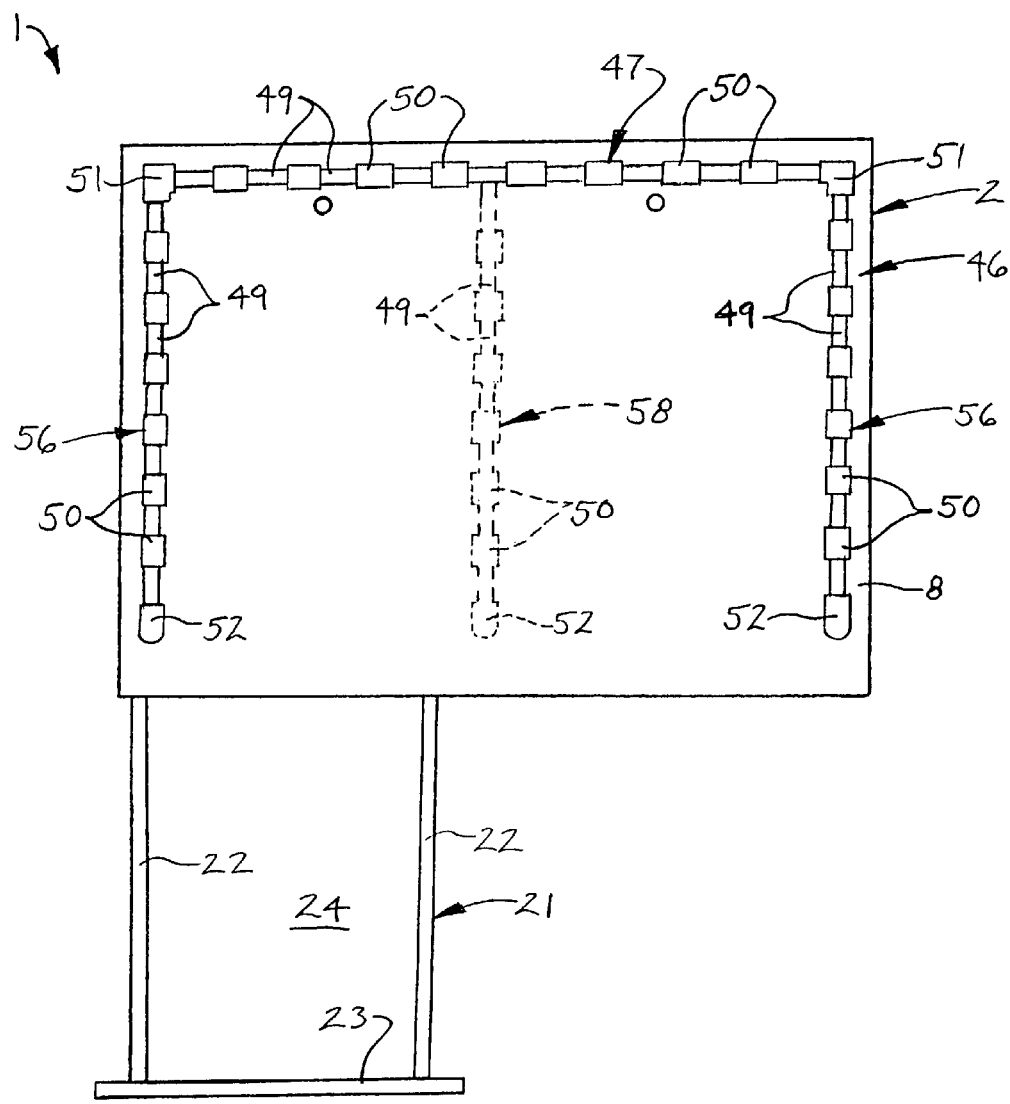
FIG. 4 is a top view of an illustrative embodiment of the animal loading/unloading apparatus, with a drawer element of the apparatus shown in an extended configuration.

As illustrated in FIG. 1, a middle partition 14 extends between the bottom base panel 3 and the platform panel 8, generally midway between the side base panels 4. A drawer space 20 and a ramp space 30 are provided on opposite sides of the middle partition 14. A drawer 21 is extendable from the drawer space 20. As shown in FIG. 4, the drawer 21 typically has a conventional design and includes a pair of spaced-apart, parallel drawer sides 22; a drawer front 23 extending between the drawer sides 22; and a drawer bottom 24 provided on the drawer sides 22 and drawer front 23. Runners (not illustrated) are provided on the respective drawer sides 22 and slidably engage respective rails (not shown) provided in the drawer space 20, typically in the conventional manner. As shown in FIG. 1, a finger opening 25 may extend through the drawer front 23.

As shown in FIG. 1, a ramp 34 is selectively extendable from the ramp space 30 of the base 2. In some embodiments of the apparatus 1, the ramp 34 includes a top ramp section 35 which is slidably mounted with respect to the base 2 and a bottom ramp section 42 which is slidably mounted with respect to the top ramp section 35, according to the knowledge of those skilled in the art. A catch (not illustrated) is typically provided on the top ramp section 35 to engage the bottom ramp section 42 and prevent the bottom ramp section 42 from sliding off the top ramp section 35. Each of the top ramp section 35 and the bottom ramp section 42 includes an elongated ramp frame 36 and a pair of ramp rails 37 which extends along respective side edges of the ramp frame 36. The ramp frame 36 and each ramp rail 37 is typically a lightweight, impact-resistant plastic or a lightweight metal such as aluminum. In some embodiments, ramp carpet 38 is provided on the ramp frame 36. In other embodiments, a treaded surface (not illustrated) may be provided on the ramp frame 36. A pair of ramp mount brackets 32 is provided in the ramp space 30. The ramp rails 37 of the top ramp section 35 slidably engage the respective ramp mount brackets 32 in the ramp space 30. The bottom ramp section slidably engages the top ramp section 35 according to the knowledge of those skilled in the art. Accordingly, as shown in FIG. 3, in the extended, functional configuration of the ramp 34, when the base 2 rests on a table 62 or other support above a supporting surface 80, the top ramp section 35 can be extended from the ramp space 30 of the base 2 and the bottom ramp section extended from the top ramp section 35 and rested on a supporting surface 80.

A fence 46 is provided on the base 2. The fence 46 extends from the platform panel 8 of the base 2. In some embodiments of the apparatus 1, the fence 46 is detachable with respect to the platform panel 8. As shown in FIG. 4, in some embodiments of the apparatus 1, the fence 46 includes a rear fence section 47 and a pair of side fence sections 56 which extend from the rear fence section 47 in generally parallel, spaced-apart relationship with respect to each other. Each side fence section 56 is disposed at a generally 90-degree angle with respect to the rear fence section 47. The rear fence section 47 and each side fence section 56 typically extend in generally parallel, adjacent relationship with respect to respective edges of the base 2. As further illustrated in FIG. 4, in some embodiments of the apparatus 1, the fence 46 includes a middle fence section 58 which extends from the rear fence section 47, typically about midway between the side fence sections 56. The middle fence section 58 may have a construction which is the same as that of the rear fence section 47 and each of the side fence sections 56.

The fence 46 may have any structure which is suitable for the purpose. As illustrated in FIGS. 1-3, in some embodiments of the apparatus 1, the rear fence section 47 and each side fence section 56 of the fence 46 includes multiple, typically plastic or metal vertical fence members 48 which extend from the platform 8. Typically plastic or metal horizontal fence members 49 extend between the adjacent vertical fence members 48. As shown in FIG. 4, corner connectors 51 connect the terminal horizontal fence member 49 of each side fence section 56 to the terminal horizontal fence member 49 of the rear fence section 47. Middle connectors 50 connect the horizontal fence members 49 of the rear fence section 47 and each side fence section 56 to each other. End connectors 52 terminate the ends of the respective side fence sections 56.

Figure 7:
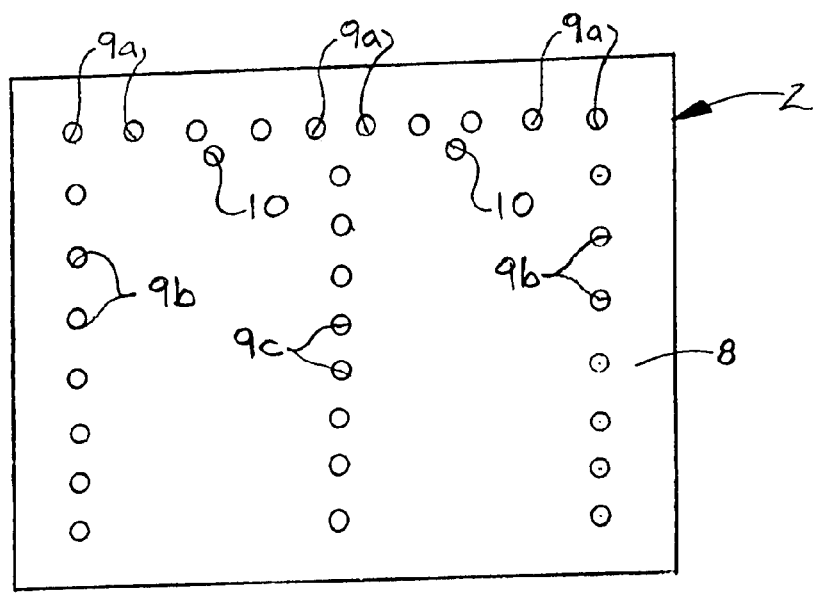
FIG. 7 is a top view of a base element of an illustrative embodiment of the apparatus, with the fence element of the apparatus removed from the base.

The fence 46 may be attached to the platform 8 using any suitable technique which is known by those skilled in the art. As shown in FIG. 7, in some embodiments of the apparatus 1, multiple fence post openings 9 are provided in the upper surface of the platform 8. The fence post openings 9 include multiple rear fence post openings 9a and multiple side fence post openings 9b. Accordingly, the vertical fence members 48 of the rear fence section 47 and of each side fence section 56 are detachably inserted in the respective rear fence post openings 9a and side fence post openings 9b. In some embodiments of the apparatus 1, multiple middle fence post openings 9c are further provided in the upper surface of the platform 8, generally midway between the sets of side fence post openings 9b. The middle fence post openings 9c receive the respective vertical fence members 48 of the middle fence section 58 (shown in phantom in FIG. 4).

Figure 5:
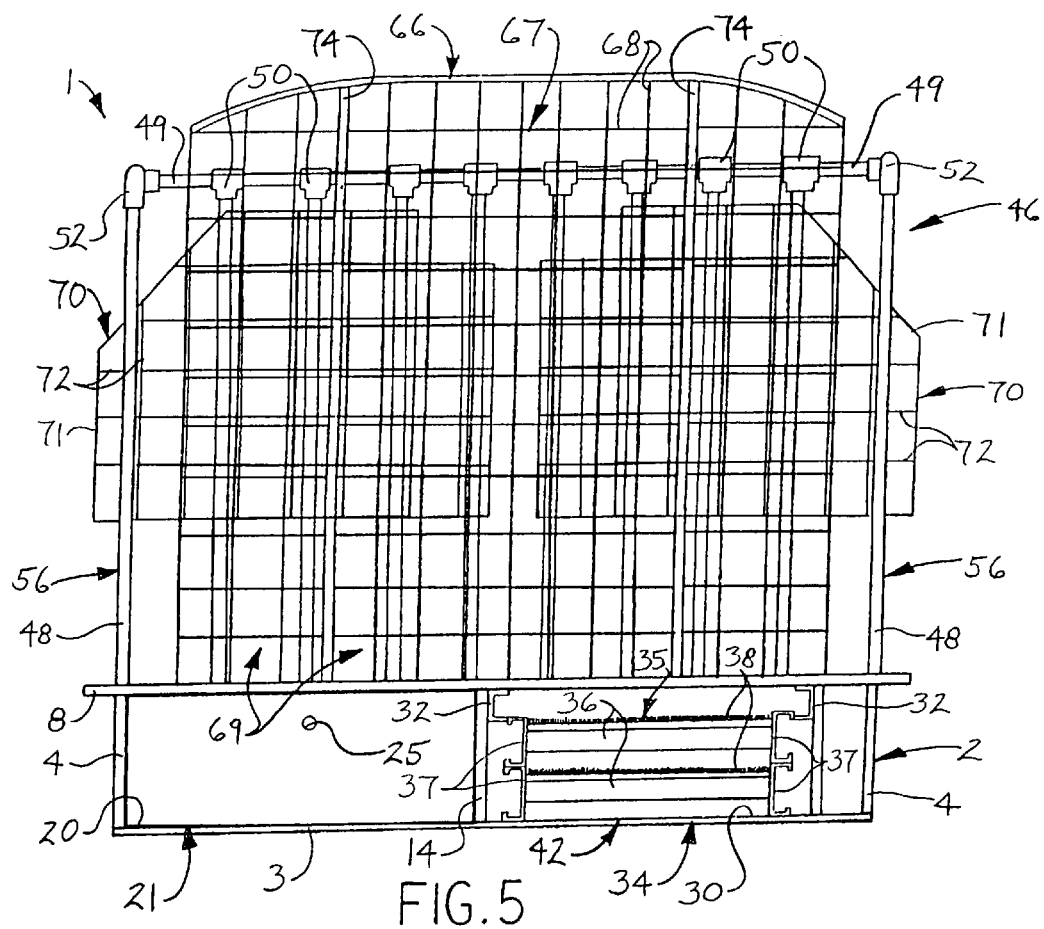
FIG. 5 is a front view of an illustrative embodiment of the animal loading/unloading apparatus, with a guard attached to a platform element of the apparatus.
Figure 6:
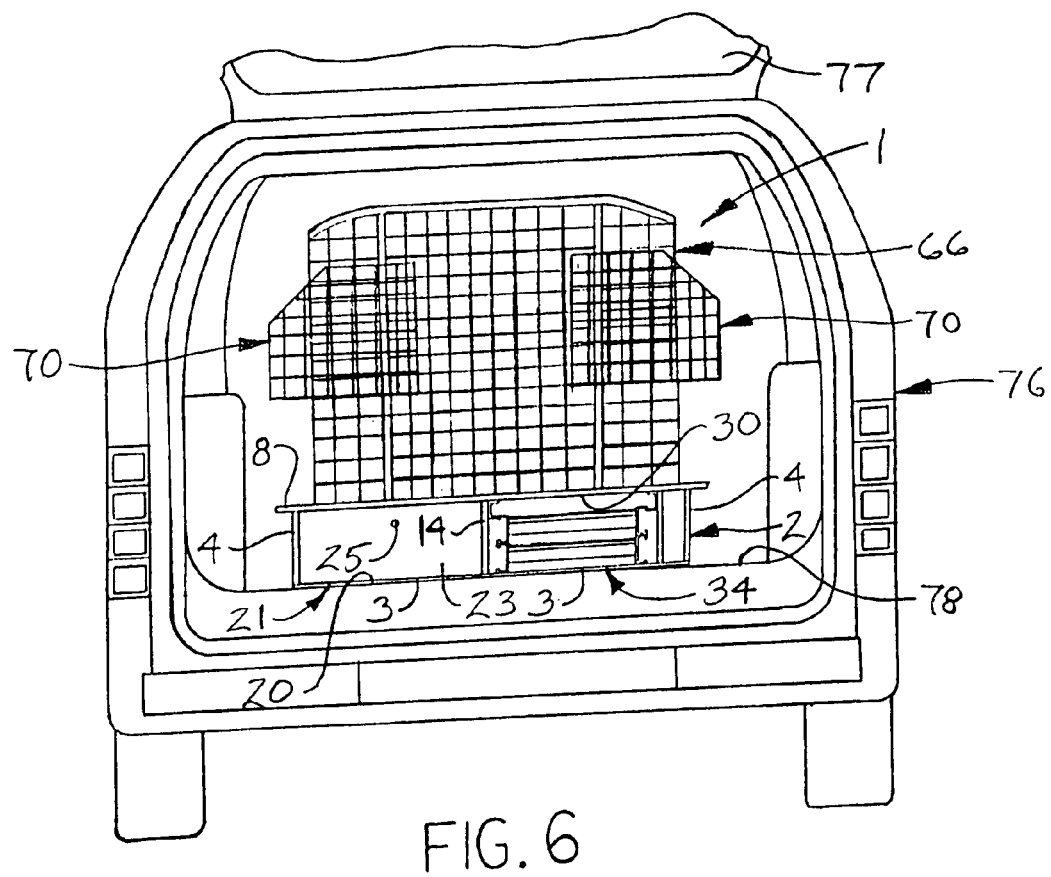
FIG. 6 is a rear view of a sport utility vehicle, with an illustrative embodiment of the apparatus situated in the vehicle.

As shown in FIGS. 5 and 6, in some embodiments of the apparatus 1, a guard 66 is detachably provided on the platform panel 8 of the base 2 for purposes which will be hereinafter described. The guard 66 typically has a generally rectangular guard frame 67 having intersecting guard frame members 68. Guard frame openings 69 are defined by and between the guard frame members 68. As illustrated in FIG. 5, a pair of spaced-apart guard posts 74 extends from the guard frame 67 of the guard 66. The guard posts 74 are adapted for removable insertion in a pair of respective guard post opening 10 (FIG. 7) provided in the upper surface of the platform panel 8 detachably secure the guard 66 to the platform panel 8.

At least one guard panel 70 may be detachably attached to the guard 66. In some embodiments, a pair of guard panels 70 is attached to the guard 66, as shown in FIG. 5. Each guard panel 70 typically includes a guard panel frame 71 and intersecting guard panel members 72 which extend within the guard panel frame 71.

As illustrated in FIG. 6, in typical application the apparatus 1 is placed in the rear cargo area of a vehicle 76 such as a sport utility vehicle (SUV), for example. In some embodiments, the base 2 is adapted for attachment to the conventional D-rings (not illustrated) which are provided in SUVs. The cargo area of the vehicle 76 is closed by a hatchback or other type of rear door 77. The bottom base panel 3 of the base 2 is rested on the floor 78 of the vehicle 76, with the drawer space 20 and the ramp space 30 of the base 2 facing rearwardly. The ramp 34 is extended from the ramp space 30 into the functional position shown in FIG. 3 by initially pulling the top ramp section 35 from the ramp space 30 and then the bottom ramp section 42 from the top ramp section 35 until the bottom ramp section 42 rests on a supporting surface 80 such as a floor of a garage, for example. An animal (not illustrated) such as a dog, for example, can then be loaded onto the platform panel 8 of the base 2 for transportation of the animal by guiding the animal as the animal walks up the bottom ramp section 42 and top ramp section 35, respectively, of the ramp 34 and then onto the platform panel 8 of the base 2. The ramp 34 is then pushed back into the ramp space 30, after which the rear door 77 of the vehicle 76 is closed. The fence 46 prevents the animal from wandering off of the base 2 and into other areas of the vehicle 76. As illustrated in phantom in FIG. 4, under circumstances in which it is desired to separate the platform panel 8 into separate adjacent sections, the middle fence section 58 can be deployed between the side fence sections 56 by inserting vertical fence members 48 of the middle fence section 58 into the respective middle fence post openings 9c (FIG. 7). In cases in which the animal is a small dog or the like, the guard 66 can be attached to the base 2 adjacent to the fence 46 to prevent the animal from escaping from the apparatus 1 between adjacent vertical fence members 48 of the fence 46. Various items (not illustrated), such as animal care products, for example, can be placed in the drawer 21 for convenient access, as needed. The drawer 21 may be fitted with various openings (not illustrated) to receive attachments and the like. After transportation of the animal in the vehicle 76, the rear door 77 is opened; the ramp 34 extended from the ramp space 30 in the base 2 and rested on a supporting surface 80 (FIG. 3); and the animal guided from the platform panel 8, down the ramp 34 and onto the supporting surface 80. The apparatus 1 can be easily removed from the vehicle 76 as needed.

While the preferred embodiments of the invention have been described above, it will be recognized and understood that various modifications can be made in the invention and the appended claims are intended to cover all such modifications which may fall within the spirit and scope of the invention.

What is claimed is:

1. An animal loading, unloading, and confining apparatus configured to be placed in a rear cargo area of a light vehicle, for use in transporting small animals in the light vehicle, comprising:
   a generally elongated, rectangular base configured to be positioned widthwise in the cargo area of the light vehicle, having a ramp space;
   a fence carried by said base and having an elongated first fence section parallel to a longitudinal axis of said base and second and third fence sections extending from said first fence section in spaced-apart relationship with respect to each other;
   a middle fence section extending from said first fence section between said second fence section and said third fence section;
   said second fence section, said third fence section and said middle fence section transverse to the longitudinal axis of said base;
   a ramp extendible from said ramp space;
   a plurality of vertical fence members extending from the base and a plurality of horizontal fence members extending between the plurality of vertical fence members;
   a drawer extendible from the base;
   a guard carried by said base generally adjacent to said first fence section and between said second fence section and said third fence section; and
   a plurality of connectors connecting the plurality of horizontal fence members to the plurality of vertical fence members, thereby creating adjacent sections within the fence for confining multiple small animals separated from one another therein and for transporting the separated small animals with the light vehicle, the adjacent areas within the fence being separated by the middle fence.

2. The apparatus of claim 1 wherein the light vehicle is a sport utility vehicle.

3. The apparatus of claim 1 wherein said guard comprises a guard frame having a plurality of intersecting guard members.

4. The apparatus of claim 1 further comprising at least one guard panel carried by said guard.

5. The apparatus of claim 4 wherein said at least one guard panel comprises a guard panel frame and a plurality of intersecting guard panel members extending within said guard panel frame.

6. The apparatus of claim 1 wherein the apparatus is configured to be placed in a cargo area of a light vehicle, wherein the light vehicle has an enclosed cargo area.

7. The apparatus of claim 1, further comprising:
a bottom base panel as a bottom portion of the base, the bottom base panel being configured to be disposed on a floor of the cargo area of the light vehicle when the apparatus is placed in the rear cargo area and the bottom base panel being further configured to be disposed on the floor of the rear cargo area without being, directly or indirectly, attached or fixedly coupled with the floor and wherein the bottom base panel is separate from and not a part of the floor of the rear cargo area; and
wherein:
the base is fixedly and non-slideably coupled with the fence;
the bottom base panel and the fence define an exterior surface of the apparatus that is configured to be unattached to and not coupled to any interior walls or surfaces of the rear cargo area when the apparatus is placed in the rear cargo area; and
the fence is separate from and not a part of any walls or interior surfaces of the rear cargo area of the light vehicle.

8. An apparatus, configured to be placed in a rear cargo area of a light vehicle, for loading, unloading and transporting small animals, comprising:
a generally elongated, rectangular base configured to be positioned widthwise in the cargo area, having a ramp space, a bottom base panel, a pair of spaced-apart side base panels extending from the bottom base panel, a rear base panel extending between the side base panels and a platform panel carried by the side base panels and the rear base panel in spaced-apart relationship with respect to the bottom base panel and wherein the ramp space is defined between the bottom base panel and the platform panel;
a drawer space provided in the base adjacent to the ramp space and a drawer extendible from the drawer space;
a fence carried by said base and having an elongated first fence section parallel to a longitudinal axis of said base and second and third fence sections extending from said first fence section in spaced-apart relationship with respect to each other;
a middle fence section extending from said first fence section between said second fence section and said third fence section;
said second fence section, said third fence section and said middle fence section transverse to the longitudinal axis of said base; and
a ramp extendible from said ramp space;
wherein each fence section comprises a plurality of vertical fence members extending from the base and a plurality of horizontal fence members extending between the plurality of vertical fence members, and a plurality of connectors connecting the plurality of horizontal fence members to the plurality of vertical fence members thereby creating adjacent sections within the fence for confining multiple small animals separated from one another therein and for transporting the separated small animals within the light vehicle, the adjacent sections within the fence being separated by the middle fence.

9. The apparatus of claim 8 wherein the light vehicle is a sport utility vehicle.

10. The apparatus of claim 8 wherein said ramp comprises a first ramp section extendible from said base and a second ramp section extendible from said first ramp section.

11. The apparatus of claim 10 wherein said first ramp section and said second ramp section each comprises a pair of spaced-apart ramp rails, a ramp frame extending between said ramp rails and ramp carpet provided on said ramp frame.

12. The apparatus of claim 10 further comprising a pair of ramp mount brackets carried by said base in said ramp space and wherein said first ramp section slidably engages said pair of ramp mount brackets.

13. The apparatus of claim 8 wherein the apparatus is configured to be placed in a cargo area of a light vehicle, wherein the light vehicle has an enclosed cargo area.

14. The apparatus of claim 8, wherein:
the bottom base panel is configured to be disposed on a floor of the cargo area of the light vehicle when the apparatus is placed in the rear cargo area, the bottom base panel being further configured to be disposed on the floor of the rear cargo area without being, directly or indirectly, attached or fixedly coupled with the floor and the bottom base panel being separate from and not part of the floor;
the base is fixedly and non-slideably coupled with the fence;
the bottom base panel and the fence define an exterior surface of the apparatus that is configured to be unattached to and not coupled to any interior walls or surfaces of the rear cargo area when the apparatus is placed in the rear cargo area; and
the fence is separate from and not a part of any walls or interior surfaces of the rear cargo area of the light vehicle.

15. An animal loading, unloading, and confining apparatus placed in a rear cargo area of a light vehicle, comprising:
a generally elongated, rectangular base having a bottom base panel, a pair of side base panels extending from said bottom base panel, a rear base panel extending between said pair of side base panels, a platform panel carried by said pair of side base panels and said rear base panel and a ramp space and a drawer space defined between said bottom base panel and said platform panel;
a first set of fence post openings provided in said platform panel;
second and third sets of fence post openings provided in said platform panel in spaced-apart relationship with respect to each other and extending from said first set of fence post openings;
a middle set of fence post openings provided in said platform panel between said second and third sets of fence post openings;
a pair of guard post openings provided in said platform panel;
a fence carried by said platform panel and having an elongated first fence section detachably inserted in said first set of fence post openings, second and third fence sections detachably inserted in said second and third sets of fence post openings and a middle fence section detachably inserted in said middle set of fence post openings;

said second fence section, said third fence section and said middle fence section transverse to the longitudinal axis of said base;

a guard carried by said platform panel generally adjacent to said first fence section and between said second fence section and said third fence section and having a pair of spaced-apart guard posts detachably inserted in said pair of guard post openings and a guard frame carried by said pair of guard posts and having a plurality of intersecting guard frame members;

a ramp having a first ramp section extendible from said ramp space and a second ramp section extendible from said first ramp section; and a drawer extendible from said drawer space, thereby creating adjacent sections within the fence for confining multiple animals separated from one another therein and for transporting the separated animals within the light vehicle.

16. The apparatus of claim 15 further comprising at least one guard panel carried by said guard.

17. The apparatus of claim 16 wherein said at least one guard panel comprises a guard panel frame and a plurality of intersecting guard panel members extending within said guard panel frame.

18. The apparatus of claim 15 wherein said fence comprises a plurality of vertical fence members detachably inserted in said fence post openings, respectively, and a plurality of horizontal fence members extending between said plurality of vertical fence members.

19. The apparatus of claim 15 wherein said first ramp section and said second ramp section each comprises a pair of spaced-apart ramp rails, a ramp frame extending between said ramp rails and ramp carpet provided on said ramp frame.

20. The apparatus of claim 15, wherein:

the bottom base panel is configured to be disposed on a floor of the rear cargo area of the light vehicle when the apparatus is placed in the rear cargo area, the bottom base panel being further configured to be disposed on the floor of the rear cargo area without being, directly or indirectly, attached or fixedly coupled with the floor and the bottom base panel being separate from and not a part of the floor of the rear cargo area;

the base is detachably, but fixedly and non-slideably coupled with the fence;

the bottom base panel and the fence define an exterior surface of the apparatus that is configured to be unattached to and not coupled to any interior walls or surfaces of the rear cargo area when the apparatus is placed in the rear cargo area; and the fence is separate from and not a part of any walls or interior surfaces of the rear cargo area of the light vehicle.

\* \* \* \* \*